Sept. 24, 1957  L. H. RUMBAUGH  2,807,164
METHOD AND MEANS FOR MEASURING SPEED
AND DEFLECTION OF A RUNNING TORPEDO
Filed July 17, 1950  4 Sheets-Sheet 1
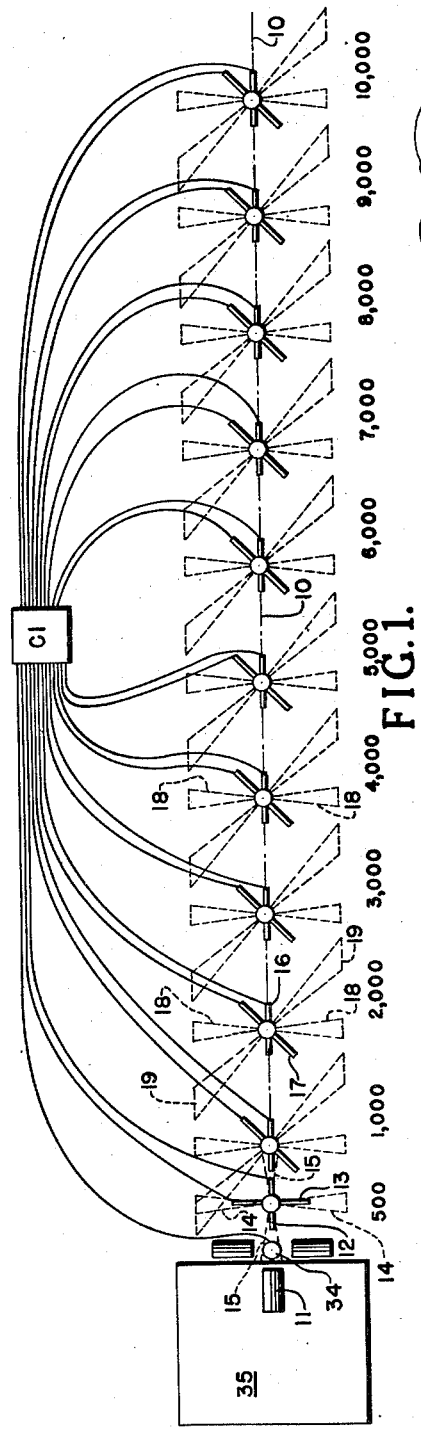
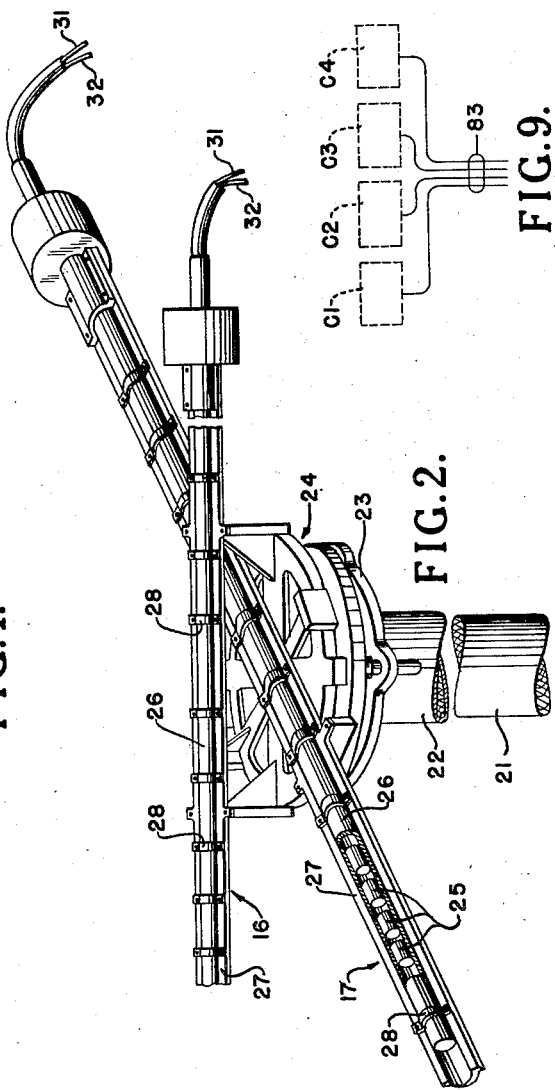
Inventor
LYNN H. RUMBAUGH Sept. 24, 1957 L. H. RUMBAUGH 2,807,164
METHOD AND MEANS FOR MEASURING SPEED
AND DEFLECTION OF A RUNNING TORPEDO
Filed July 17, 1950 4 Sheets-Sheet 2
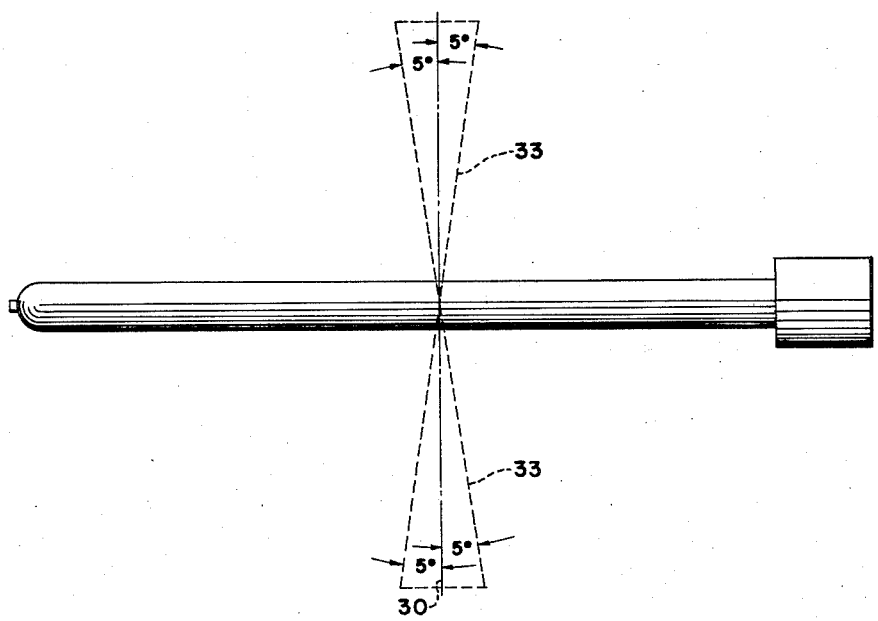
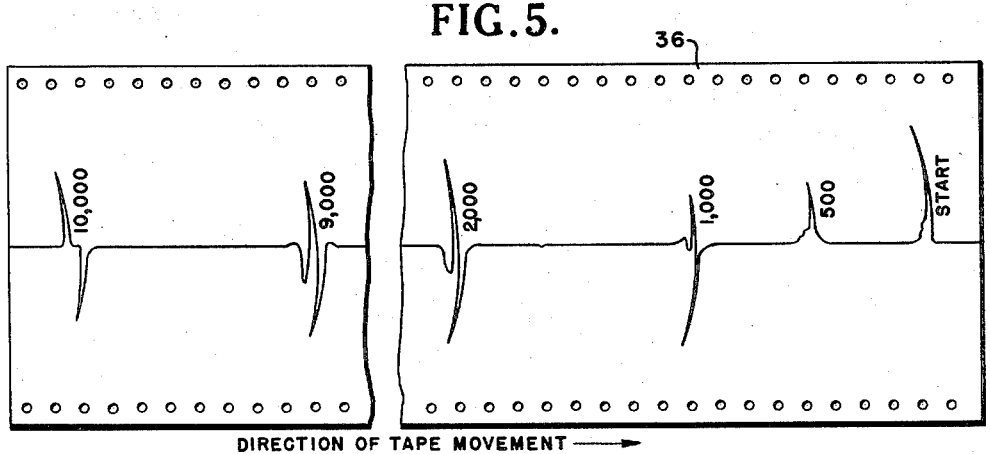
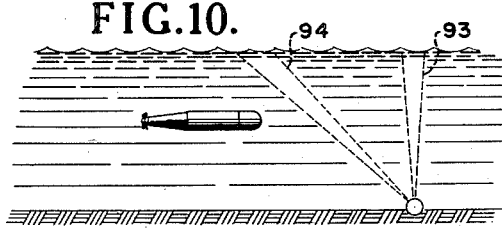
INVENTOR
LYNN H. RUMBAUGH

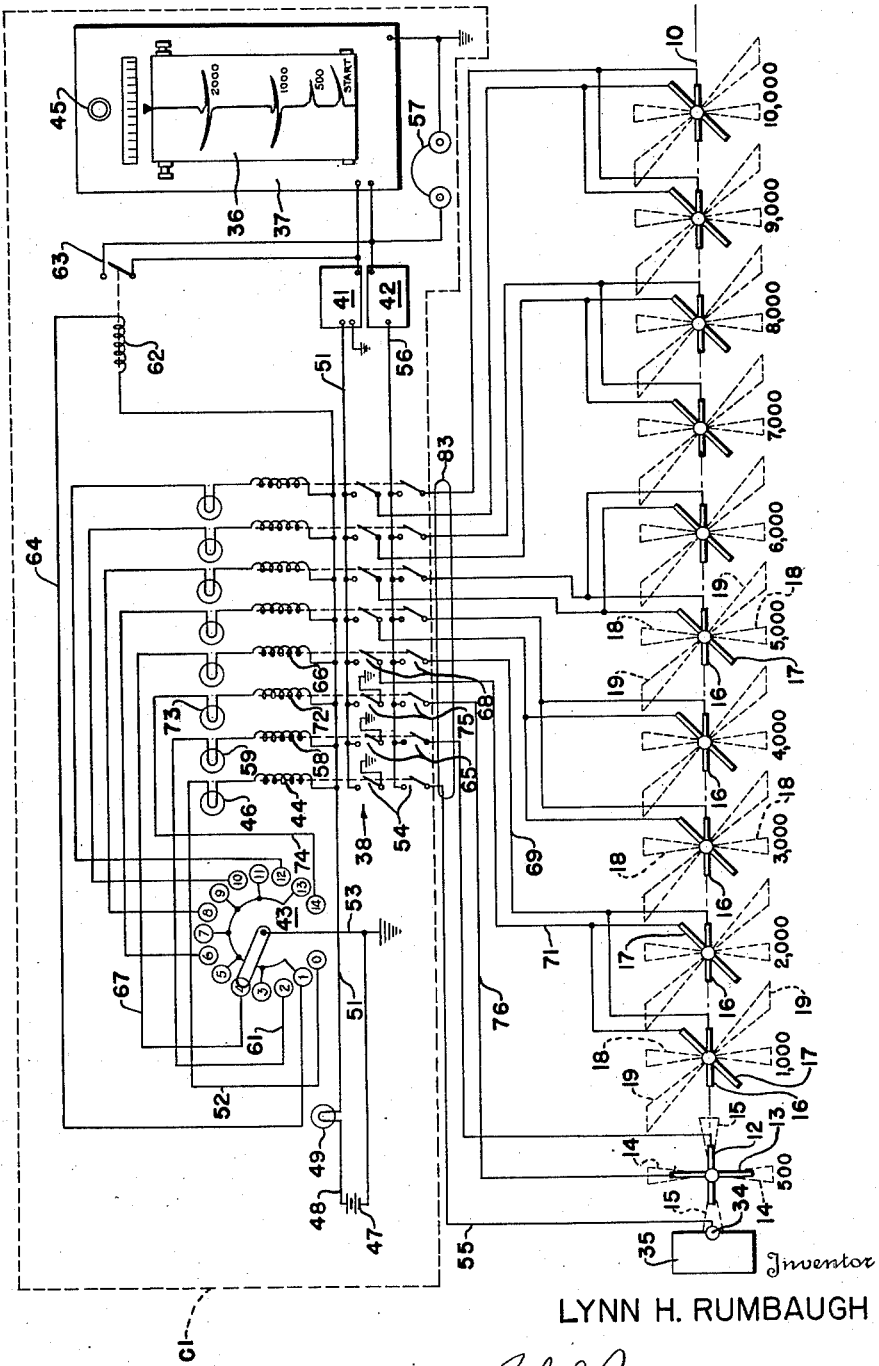

Sept. 24, 1957 L. H. RUMBAUGH 2,807,164
METHOD AND MEANS FOR MEASURING SPEED
AND DEFLECTION OF A RUNNING TORPEDO
Filed July 17, 1950 4 Sheets-Sheet 4
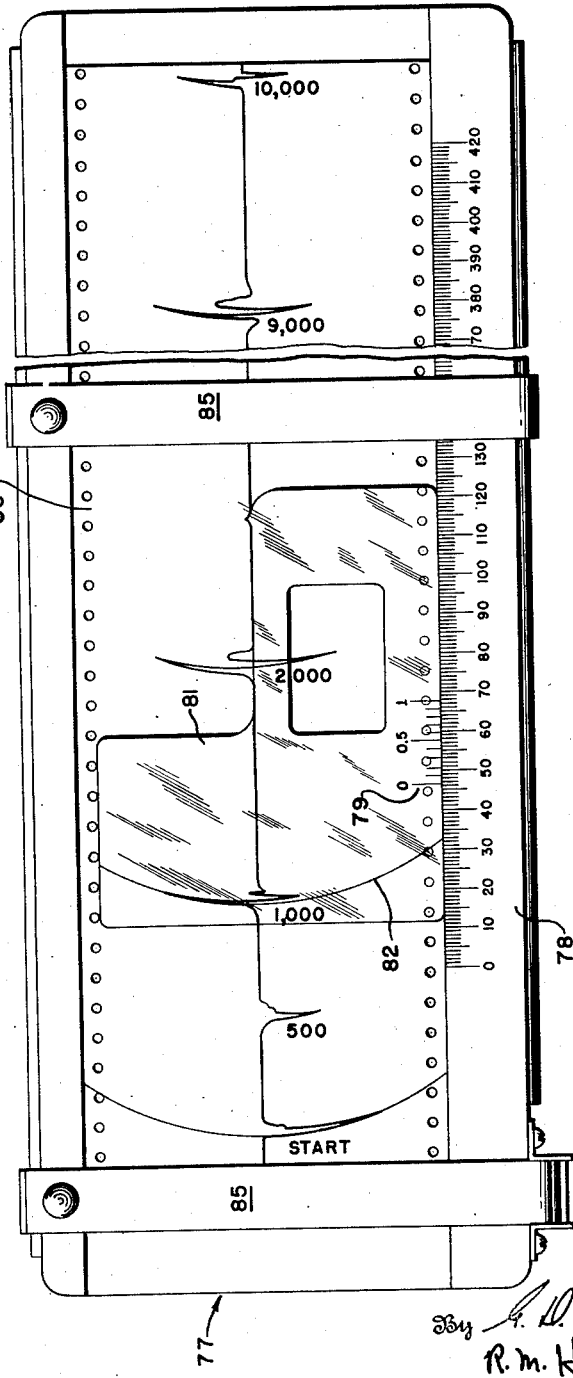
Inventor
LYNN H. RUMBAUGH

United States Patent Office 2,807,164
Patented Sept. 24, 1957

2,807,164

METHOD AND MEANS FOR MEASURING SPEED AND DEFLECTION OF A RUNNING TORPEDO

Lynn H. Rumbaugh, Washington, D. C.

Application July 17, 1950, Serial No. 174,341

3 Claims. (Cl. 73—167)

(Granted under Title 35, U. S. Code (1952), sec. 266)

The present invention relates primarily to a velocity measuring system and more particularly to a system and apparatus for recording and ascertaining the speed and deflection or deviation of a torpedo from a straight path of travel as it traverses a measured course.

One of the methods heretofore employed for measuring the speed of a torpedo requires an observer, using a spotting telescope, to make a stop watch measurement of the time taken for the wake of an air-driven torpedo to traverse the distance between two marked points on a torpedo range. Because electric propelled torpedoes leave no visible wake, they must be run at night so that a spot light in the practice head of the torpedo will be visible to an observer preferably stationed in a blimp or helicopter as the torpedo travels over the range.

As it is quite difficult for the observer to handle the spotting telescope and at the same time make accurate stop watch measurements, numerous trial runs of the torpedo would be made over the course for accurate results and an average torpedo speed obtained.

One of the objects of the present invention is to provide a novel system and apparatus for measuring and recording the velocity and deviation of a torpedo during the torpedo run.

Another object is to provide a velocity and deviation measuring and recording system and apparatus wherein the sound of the moving torpedo, as it traverses a measured course, initiates electrical impulses which are used as a measure and record of the velocity and deviation of the torpedo.

A further object is to provide a velocity and deviation measuring system and apparatus wherein a plurality of directional hydrophones having response areas traversing a measured course are caused to create an impulse as the torpedo traverses each of the response areas which response is utilized for operating a recording apparatus of the system to measure the velocity and deviation of the torpedo from the true course thereof.

Still another one of the objects is to provide a method and apparatus for measuring and recording the speed and deflection of an automotive body moving between a plurality of spaced stations along a measured course with a high degree of accuracy.

A still further object is to provide a torpedo speed and deflection course having a recorder for indicating the area in which a torpedo has sunk when it fails to complete the course.

A further object is to provide a record of the speed and deflection of each torpedo when a plurality of torpedoes are launched in succession along the torpedo course.

A further object is to provide a method and apparatus for measuring and recording the running depth of a torpedo as it passes spaced stations along a measured course.

Other objects and many of the attendant advantages of this invention will be readily appreciated as the same become better understood by reference to the following detailed description when considered in connection with the accompanying drawings wherein:

Fig. 1 is a diagrammatic plan view of a measured speed and deflection course as contemplated by the present invention;

Fig. 2 is a perspective view partly in section of a pair of directional hydrophones and illustrating the preferred arrangement for mounting the hydrophones at each station along the speed and deflection course;

Fig. 3 is a diagrammatic view of a directional hydrophone employed in the present invention and illustrating the area in which the hydrophone is acoustically responsive;

Fig. 4 is a schematic wiring diagram and apparatus employed for recording the speed and deflection of a torpedo moving along the torpedo course;

Fig. 5 is a section of a recording tape illustrating a typical torpedo signature as marked thereon;

Fig. 6 is a plan view of a tape scaler suitable for use with the present invention and illustrating how the scaler and torpedo signature is employed for measuring the time required for the torpedo to enter the sensitive area of each of the directional microphones after being launched on the torpedo range;

Fig. 7 is a view of a portion of the table employed in connection with the present invention for determining the speed, in knots, of the torpedo for the first 1,000 yards traveled along the range;

Fig. 8 illustrates the table employed in connection with the tape of Fig. 6 for determining the deflection, in yards, of the torpedo from the range center line as it passes the 1,000 yard station;

Fig. 9 is a schematic wiring diagram employed in connection with the present invention for recording simultaneously the speed and deflection of four consecutively fired torpedoes as they move concurrently along the range; and Fig. 10 is a diagrammatic view of the apparatus employed to measure the running depth of a torpedo.

Referring now to the accompanying drawings in which like numerals of reference are employed to designate like parts throughout the several views and more particularly to Fig. 1 thereof, there is shown thereon a typical torpedo range covering a distance of 10,000 yards which is divided into 10 equally spaced stations arranged along a center line 10 with each station being spaced 1,000 yards from the adjacent station with the exception of the first station which is spaced from the launching tube 11 at a distance, for example, of 500 yards. The range is preferably installed in a body of water having an approximate uniform depth of 60 to 75 feet and in which the body of water is substantially devoid of tides or cross currents.

A non-directional hydrophone 34 is installed within the water at the firing pier 35 to pick up the sound of the impact of the torpedo with the water upon launching of the torpedo from a deck tube or drop rack, or the rush of compressed air coincident with the firing of an undersea tube.

At the 500 yard station a directional hydrophone 12, more fully hereinafter described, is provided which has a response area of audio-sensitivity illustrated by the area enclosed by the dashed lines 14—14 with the longitudinal axis of the hydrophone arranged in registry with the range center line 10.

A second directional hydrophone 13 is placed at the 500 yard station with the longitudinal axis of the hydrophone arranged at 90° with respect to the center line 10. The area of audio-sensitivity of hydrophone 13 is illustrated by the area enclosed by the dashed line 15—15.

Hydrophones 12 and 13 are installed at the 500 yard station to aid the recovery crew in locating a torpedo which has failed to start properly, as will hereinafter be more fully explained.

The directional hydrophones employed in the present invention are constructed and arranged to give the maximum response to sound waves from a torpedo when the torpedo passes through a plane perpendicular to the longitudinal axis of the hydrophone. However, the hydrophones begin to produce a signal in the hydrophone when the torpedo is still 5 degrees from the perpendicular plane of the hyrophone longitudinal axis. This signal increases rapidly to a maximum and dies away to zero when the torpedo is 5 degrees beyond the perpendicular plane. The characteristic response pattern of the microphone is indicated by the area enclosed by the wedge-shaped dashed lines shown in Fig. 3 which shows a total lobe width of approximately 10 degrees equally spaced on opposite sides from the perpendicular plane 30. It will be understood that the true lobe of response of the directional hydrophone is shaped somewhat like a daisy petal and, for the purpose of illustration, the useful lobe employed in connection with the present invention is illustrated by the area enclosed by the dashed lines in Figs. 1, 3 and 4.

As each station from the 1,000 to the 10,000 yard stations inclusive, two directional hydrophones are mounted with a speed hydrophone 16 being mounted horizontally with the longitudinal axis of the phone arranged in registry with the center line 10. This hydrophone has a response area directed perpendicular to the center line 10 as indicated at 18—18. The deflection hydrophone 17 is mounted horizontally and below the speed hydrophone 16 as best shown in Fig. 2, with the longitudinal axis of the deflection phone arranged at an angle of 45° with respect to a vertical plane through the range center line 10 whereby the response area thereof is directed at 45° with respect to the center line 10 as illustrated by the area enclosed within the dashed lines 19—19 in Fig. 1 with the response area of the phone arranged to project toward the launching platform 35 on the left side of the range center line 10 as viewed in the figure. Similarly placed pairs of directional hydrophones are installed at each of the 2,000 to 10,000 yard stations. It will be observed that a torpedo proceeding along the left side of the range encounters the sensitive area of the deflection phone at each station, and then encounters the sensitive area of the speed phones in successive order. The reverse order is encounered for a torpedo proceeding up the right side of the range.

Referring now to Fig. 2, the hydrophones 16 and 17 are submerged at a uniform depth of about 50 feet below the surface of the water and are supported horizontally with the longitudinal axes of the phones intersecting at 45° on center line 10 and at their mid points on a hydrophone mount generally designated 24. The hydrophone mount 24 is provided with a pair of cradles 27 each supporting a soft rubber tube 26 into which is arranged a signal receiving element comprising a plurality of cylindrical, axially aligned, Rochelle salt crystals 25 spaced on 2 inch centers and electrically connected in series to conductors 31 and 32. The tube 26 is filled with castor oil and held within the cradle 27 by any suitable means such as the series of straps 28 illustrated. The hydrophone mount 24 may be adjusted in any well known manner in three dimensions with respect to a horizontally disposed baseplate 23 which is provided with a depending collar 22 for telescopingly engaging a pile 21. Each pile 21 is forced into the bottom of the speed range and accurately located at each station with respect to the launching tube 11 and aligned along the center line 10 as indicated with the top of each pile along the torpedo range at a uniform depth below the water surface such, for example, as 50 feet.

When the hydrophones 16 and 17 are immersed in salt water, pressure applied to the crystals 25 by incident sound waves perpendicular to the longitudinal axis of the hydrophone produces a corresponding voltage across the conductor terminals 31 and 32 of the hydrophone as the sound waves compress the crystals. When a sound wave front is parallel to the longitudinal axis of the crystals, in-phase voltages are developed at each crystal and the maximum voltage response is developed when the sound waves originate at a point perpendicular to the longitudinal axis of the hydrophones. By electrically filtering the voltage generated such, for example, as by a band-pass filter in the order of 15 to 20 kc., only the voltages produced by incident sound waves having a wave length in the order of the crystal spacing are recorded, and the hydrophone will therefore be highly directional. Beyond the 5° on either side of the maximum response line, the phase relationships between individual crystal voltages are such as to almost completely cancel each other thereby resulting in a substantial zero response from the hydrophone when sound waves approach the hydrophone from an angle beyond the response pattern 33, Fig. 3.

The hydrophone signals are amplified and recorded on a tape 36 (Figs. 5 and 6) having a constant speed, for example, of 6 inches per minute. The recorder is arranged so that a speed phone produces a kick of the recording pen to the right of the tape center line and the deflection phone produces a kick to the left of the center line. When no signal is received from either phone the recording pen traces a substantially straight line along the center of the tape.

It will be noted by inspection of Fig. 5 that the signature on the tape indicates that the torpedo proceeded up the left side of the range center line 10 and encounters first the response area of the deflection phone and then the response area of the speed phone at each station. It will also be noted that the time interval between deflection and speed kicks increases as the torpedo moves down the range thereby indicating on the recording tape that the torpedo is gradually moving away from the range center line and to the left. The deflection peak and speed peak at the 1,000 yard station are close together in the illustrated signature and the recording pen is still returning from the deflection kick when the speed kick occurs. Such a torpedo signature indicates that at 1,000 yards the torpedo is close to the center line 10 of the range and over the hydrophone station.

Referring now more particularly to Fig. 4 there is shown thereon a schematic circuit and switching system for operating the recorder 37. The relay voltage control circuits are shown in conventional fashion whereas hydrophone signal circuits are shown by a single line.

When the contacts of relays generally designated 38 are open, all hydrophones along the range are disconnected from the deflection amplifier 41 and the speed amplifier 42.

When the torpedo is ready for the speed and deflection test the operator moves the selector switch 43 to the zero position, and a circuit is completed from the power source 47, by way of conductor 48, "on" lamp 49, conductor 51, zero line relay coil 44, zero lamp 46, conductor 52, zero button and arm of switch 43, and through conductor 53 to ground thereby to energize the relay coil 44. When coil 44 is energized, contacts 54 thereof are closed to form a circuit from non-directional hydrophone 34, conductor 55, relays 54, conductor 56, speed amplifier 42 and head phones 57 to control the recorder 37, illuminate recorder lamp 45 whereby the recorder will kick the scribing pen to the right of the tape center line to mark a signature on the recording tape 36 as the hydrophone 34 operates in response to the sound of impact of the torpedo with the water upon launching from a deck tube or drop rack or the rush of compressed air as the torpedo is ejected from an under-water tube at the launching pier 35, as the case may be. It will be noted that when coil 44 is energized and contacts 54 close, deflection amplifier 41 is grounded and thus rendered inoperative as long as switch 43 is the 0 position. The operator should mark "start" on the tape 36 adjacent this starting signature to indicate at what instant the torpedo starts on the test run. The starting signature is the reference mark from which the deflection and speed are subsequently measured.

After the starting signature is marked on the tape, the operator moves the selector switch 43 to the 1 position. As the switch arm moves out of engagement with the 0 contact thereof, relay coil 44 is deenergized thereby to disconnect hydrophone 34 and close a circuit from the power source 47, conductor 48, "on" lamp 49, conductor 51, coil 62, conductor 64, 1 contact and arm of switch 43 and thence to the ground. As coil 62 is energized shorting switch contacts 63 close to short amplifiers 41 and 42 for causing the recording pen of recorder 37 to return to the center of the recording tape 36. The selector switch 43 is provided with switch buttons or contacts such as 1, 3, 5, 7, 9, 11 and 13, between each hydrophone switch button. These buttons are all connected together and to the coil 62 of the shorting relay 63 whereby relay 63 is operated each time the switch arm is brought into engagement with an odd numbered switch button. As the contacts of relay 63 close the outputs of amplifiers 41 and 42 are shorted. The transients due to moving selector switch 43 from one station to the other are thus prevented from making a mark on the recording tape 36.

After the "start" mark is recorded on tape 36 the operator moves the selector switch 43 to the 2 position and a circuit is closed from the power source 47, conductor 48, "on" lamp 49, conductor 51, 500 yard coil 58, lamp 59, conductor 61, button and arm of switch 43 and through conductor 53 to ground thereby to energize the coil of relay 58 to close relay contacts 65 thereby to connect hydrophone 12 to speed amplifier 42 and ground the input of deflection amplifier 41. As the torpedo moves through response area 14 the recording pen of recorder 34 scribes a mark on tape 36 toward the right to indicate when the torpedo has traversed the first 500 yards from the firing pier 35.

The operator should mark "500" adjacent the 500 yard speed mark on the recording tape and move the arm of selector switch 43 to button 3. As the switch arm moves out of engagement with the "2" contact thereof amplifiers 41 and 42 are disconnected from the recorder 37. As switch arm of selector switch 43 engages button 4 the hydrophones at stations at 1,000 and 2,000 yards are connected to the recorder 37 and a circuit is closed from the power source 47, conductor 48, "on" lamp 49, conductor 51, 1,000 and 2,000 yard coil of relay 66, conductor 67, button 4 and arm of selector switch 43, conductor 53 and to the ground to energize coil of relay 66 to close the relay contacts 68. When contacts 68 are closed, both speed and directional hydrophones 16 and 17 respectively connected in parallel at the 1,000 and 2,000 yard stations are connected to the speed amplifier 42 by way of conductor 69, relay 68, conductor 56 and speed amplifier 42. The deflection hydrophones 17 connected in parallel at the 1,000 and 2,000 yard stations are connected by way of conductor 71, relay 68, conductor 51 and to the deflection amplifier 41. When the recorder marks a torpedo signature on the tape 36 representing 2,000 yards the operator moves arm of switch 43 to number 5 button and then to number 6 button which causes the 3,000 and 4,000 yard microphone stations to be connected to the recorder 37.

Similarly, when the arm of selector switch 43 is moved to buttons 8, 10 and 12 respectively, pairs of speed and deflection hydrophones along the best range are consecutively connected to the speed and deflection amplifiers which operate the recorder 37 whereby a torpedo signature is recorded on the tape 36 as the torpedo passes by each station in successive order along the range.

At the 500 yard station a directional microphone 13 is installed with the longitudinal axis of the hydrophone arranged at 90° with respect to the range center line, the hydrophone having a response pattern illustrated by the area enclosed by the dashed line 15—15 disposed along the center line 10.

In the event that a torpedo has been launched but fails to indicate on the tape that it has passed the 500 yard station within a reasonable length of time, the operator should move the arm of the selector switch 43 to button 14. When selector switch 43 is on button 14 a circuit is completed from power source 47, conductor 48, "on" lamp 49, conductor 51, coil of relay 72, trouble lamp 73, conductor 74, button 14, and arm of selector switch 43, conductor 53 and to ground to energize coil 72. When coil 72 is energized contacts 75 engage to close a circuit from microphone 13, conductor 76, contacts 75, conductor 56, speed amplifier 42, recorder 37 and head phones 57 in parallel, and thence to the ground. Deflection amplifier is grounded and ineffective when contacts 75 are closed.

If the torpedo is proceeding down the range the speed amplifier will operate to energize the recorder thereby to scribe a mark on the tape to the right of the tape center line and the operator will hear the torpedo through the head phones 57. If there is no response it indicates that the torpedo has failed to start and this information will assist the retriever crew in recovering the torpedo and indicate that the torpedo has sunk in the area of the 500 yard station.

It will be observed in Fig. 4 that the switches, relays and other electrical devices enclosed within the dashed outline C1 is known as a control station and illustrates schematically the various devices employed in connection with the present invention for operating the speed and deflection range for obtaining a single torpedo signature during a test run. It will also be observed that the various conductors from the hydrophones along the range are led into the control station through a waterproof multiple conductor cable 83. In practice, however, a plurality of control stations such for example as the four control stations C1, C2, C3 and C4 are connected to the hydrophones as illustrated in Fig. 9, each recorder being operated independently to follow the torpedo to which it is assigned. Thus, in the example illustrated, the signatures of four torpedoes may be obtained concurrently in consecutive order, one operator being required for each pair of recorders by starting a second torpedo along the range after the first torpedo has passed the 2,000 yard hydrophone.

A typical torpedo signature on a recording tape 36 is shown in Figs. 5 and 6. It will be noted that the first peak of each signature is to the left of the tape center line which indicates that the torpedo traversed the range on the left side of the center line 10. This torpedo performance is known because the deflection amplifier is connected to produce a left deflection of the recording pen. The speed peaks are upward as viewed in Fig. 5 and to the right as viewed in Fig. 4, and it will be noted that the time interval between deflection and speed kicks increases as the torpedo travels along the range thereby to indicate that the torpedo is gradually moving away from the range center line 10.

It will be further noted that the deflection and speed peaks at the 1,000 yard station are so close together that the recording pen is still returning from the deflection kick when the speed kick occurs.

Referring now more particularly to Fig. 6, on which is shown the recording tape 36 placed on a tape scaler 77, the main scale 78 is ruled off, for example, in tenths of inches and the transparent slide member 81 is provided with a vernier at 79 arranged to coact with the scale 78 whereby reading to the nearest hundredth of an inch may be obtained.

It will be recalled that the speed of the tape 36 is 6.00 inches per minute, therefore, each large division (0.1 inch) represents a speed as measured along the recording tape 36 of one second and each small division on the vernier 79 represents 0.1 second so that time intervals can be scaled to 0.05 second. The transparent slide member 81 is provided with an engraved reference line 82 having the radius of curvature equal to the radius of movement of the recording pen of recorder 37.

Tape 36 is placed on the tape scaler 77 with the "0" of the vernier in registry with "0" of the main scale 78 and "start" signature in registry with reference line 82 of the slide member 81. A plurality of clamps 85, hinged to the scaler 77, are secured to hold the recording tape 36 firmly in place along the scaler. The slider is then moved successively to each of the speed and deflection signatures and the time intervals read off the main scale to ±0.1 second, for example, vernier 79 reads 46.3 seconds on main scale 79 as illustrated in Fig. 6.

By referring to the speed table, Fig. 7, the time in seconds required for the torpedo to reach 1,000 yards, for example, 46.3 seconds after the "start" signature, it is possible to read directly the average speed in knots made by the torpedo to the nearest tenth of a knot, for example, 38.3 knots.

Since the time interval between the speed and deflection peaks, for example is 0.5 second, is a function of torpedo speed, it is necessary to know the torpedo speed before the deflection of the torpedo can be ascertained.

Referring now more particularly to Fig. 8, which illustrates a portion of one of the deflection tables which are employed in connection with the torpedo transit time over the 1,000 yards preceding or following, as the case may be, the station where deflection is measured.

Knowing that the torpedo requires 46.3 seconds to traverse 1,000 yards, by locating the nearest whole number of second, such for example, as 46 seconds in the left hand column of the deflection scale of Fig. 8, and knowing the time interval between speed and deflection peaks to be 0.5 second, reading down the figure 11 yards deflection from center line 10 at 1,000 yards is selected.

Whereas the invention has been described with particularity with reference to a system for measuring the rate of speed and the yaw of a torpedo from a fixed course it is obviously not so limited as it may also be employed, if desired, to measure the running depth of the torpedo at selected points throughout the course. To accomplish this result it is merely necessary to arrange the hydrophones, Fig. 10, such that the directional beam 93 of one of the hydrophones as indicated by the dashed lines at 93 is vertical and normal to the line of travel of the torpedo and the beam of the other hydrophone, as indicated by the dashed lines at 94, is arranged at a 45° angle with respect to both the line of travel of the torpedo and the beam of the first microphone. Preferably though not necessarily the pair of hydrophones comprising a station detecting element is located at the bed of the body of water within which the speed range is disposed.

From the foregoing it will be clearly apparent that the time of travel of the torpedo between each of the intersecting beams 93 and 94 of a pair of hydrophones may be employed for determining the depth of the torpedo by reason of the known depth of the water at the detecting station and the 45° characteristic relationship of the two intersecting planes of detection of the hydrophones.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed as new and desired to be secured by Letters Patent is:

1. A method for measuring the speed along and deviation of a torpedo from a straight line as the torpedo moves over a straight measured course having a first directional hydrophone at the beginning of said course with the response area of the hydrophone arranged transverse the straight line of said course at right angles thereto, a second directional hydrophone at the terminal of said course with the response area of the hydrophone arranged transverse said straight line at right angles thereto, and a third directional hydrophone at the terminal of said course with the response area of the hydrophone arranged transverse said straight line at 45° thereto, comprising the steps of receiving signals from each of the hydrophones respectively as the torpedo traverses said response areas during movement of the torpedo along the course, measuring the elapsed time between signals produced by said first and second hydrophones as said torpedo traverses said response areas thereof respectively during movement of said torpedo along said course, measuring the elapsed time between the signals produced by said second and third hydrophones as said torpedo traverses said response areas thereof and determining the torpedo path deviation by making a comparison between said first and second elapsed time measurements.

2. Apparatus for measuring the deflection of a torpedo from a straight line and the velocity thereof as the torpedo moves over a measured course therealong comprising, in combination, a first directional hydrophone submerged within the water with the response area thereof arranged transverse the path of travel of the torpedo at the beginning of said course, a second directional hydrophone submerged within the water with the longitudinal axis thereof in coaxial predetermined spaced relation with respect to said first hydrophone and with the response area of the second hydrophone arranged transverse the path of travel of the torpedo at the terminal of said course, means responsive to an electrical impulse generated in said first and second hydrophones by the passage of the torpedo through said response areas respectively for indicating the presence of the torpedo as it traverses said course whereby the successive impulses produce a time interval record from which the velocity of the torpedo can be computed, a third directional hydrophone submerged within the water with the response area thereof arranged transverse both the response area of said second hydrophone and the path of travel of the torpedo at 45°, and means responsive to an electrical impulse generated by said third hydrophone by the passage of said torpedo through said last named response area for indicating the presence of said torpedo as it traverses said course whereby the deviation of the torpedo at the termination of the course can be computed as the product of the speed and the elapsed time between the second and third impulses.

3. Apparatus for measuring the depth of a torpedo having a known speed as it moves along a course of known depth comprising, a first directional hydrophone at a station adjacent the bed of the course with the acoustical response plane thereof arranged vertical and normal to the path of movement of the torpedo, a second directional hydrophone at said station with the acoustical response plane thereof arranged at 45° with respect to both the path of movement of the torpedo and a horizontal plane, the response planes intersecting at said station, means for receiving and recording a time record of signals from each of said hydrophones respectively as the torpedo traverses the respective response planes thereof, whereby the depth of the torpedo at said station may be computed as the difference between the known depth of the course at the station and the product of the speed of the torpedo and elapsed time between said signals as determined from said time record.

References Cited in the file of this patent

UNITED STATES PATENTS

| | | |
|---|---|---|
| 1,332,810 | Danielson | Mar. 2, 1920 |
| 1,864,638 | Chilowsky | June 28, 1932 |
| 2,146,723 | Dunham et al. | Feb. 14, 1939 |
| 2,157,572 | Roberts | May 9, 1939 |
| 2,480,561 | Ewing et al. | Aug. 30, 1949 |
| 2,498,045 | Looney et al. | Feb. 21, 1950 |